Figure 1:
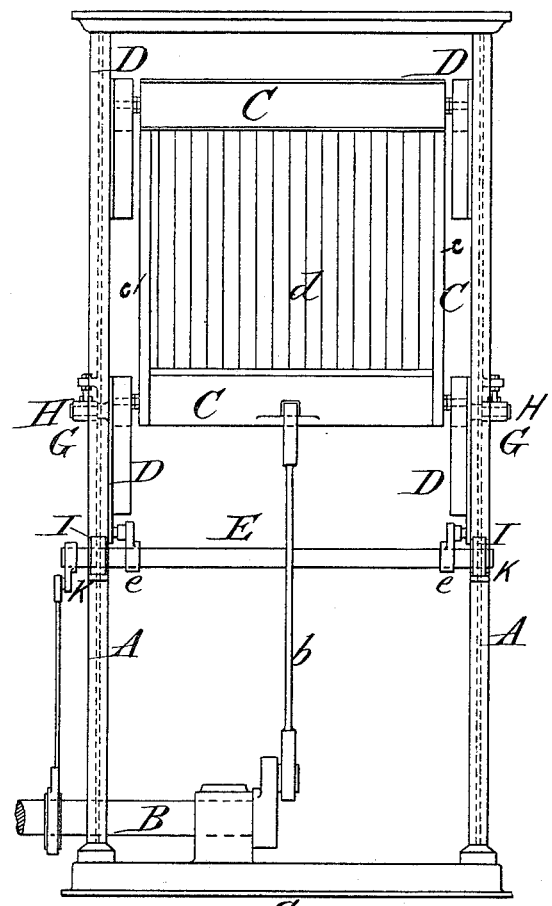

(No Model.)  2 Sheets—Sheet 1.

H. McEVILLA.
RECIPROCATING SAW MILL.

No. 339,000.  Patented Mar. 30, 1886.

Witnesses.
Robert Weir,
John O. Howell

Inventor.
Henry McEvilla (No Model.) 2 Sheets—Sheet 2.

H. McEVILLA.
RECIPROCATING SAW MILL.

No. 339,000. Patented Mar. 30, 1886.

Witnesses.
Robert Weir
John O. Howell

Inventor.
Henry McEvilla

UNITED STATES PATENT OFFICE.

HENRY McEVILLA, OF MUSKEGON, MICHIGAN.

RECIPROCATING-SAW MILL.

SPECIFICATION forming part of Letters Patent No. 339,000, dated March 30, 1886.

Application filed January 15, 1886. Serial No. 188,672. (No model.)

*To all whom it may concern:*

Be it known that I, HENRY McEVILLA, a citizen of the United States, residing at Muskegon, in the county of Muskegon and State of Michigan, have invented certain new and useful Improvements in Gang-Saw Mills; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention embraces an improvement in gang-saw mills, and relates more particularly to those devices whereby the gang of saws is oscillated, and whereby the rake of the saws is made variable between the two limits of the stroke.

Ordinarily in straight gang-saws the saws drop from the top to the bottom of the cut in a straight line. The rake in this case is produced by hanging the saws forward on the top end, or by inclining the slides at the bottom end, but the same rake is maintained throughout the entire length of the stroke, the rake being constant and equal to the travel or speed of the saw, while the speed of the saw itself is very slow at the beginning of the stroke and increases faster in proportion. As it reaches the quarter, it is evident that the feed, being at all times constant, the saws will cut more at the top and bottom of the stroke than at the center. More power is necessarily expended in driving the saws in this form of construction than when the rake varies in such a manner as to allow the saws to cut equal at all points through the entire length of the stroke.

My invention therefore consists in such an arrangement of parts that there shall be no rake except below the center of oscillation of the lower slides, and the rake shall vary continually as the saw travels on, and proportionately to the feed of the log. The lower slides are so arranged and operated that the strain on the saw, together with the work performed by it, shall be equalized through the entire length of the stroke. This is accomplished by so situating the pins on which the lower slides oscillate that they will be below the center of the pins on the bottom gird of the gate when the gate is at the top of its stroke.

The invention further consists in providing means whereby the rake of the saw can be adjusted to correspond with the feed—that is, the ratio of the rake to the feed is made constant when running the feed at different speeds. This is accomplished by locating the rock-shaft which operates the lower slides in eccentric boxes, which enable the said shaft to be moved laterally to or from the gang, this difference of movement in the rock-shaft corresponding with the difference of feed. Consequently, when once properly adjusted, the relation between the feed and the rake will be equally maintained at all times. And the invention further consists in certain peculiarities in the construction and combination of parts, as will be hereinafter fully set forth.

Figure 2:
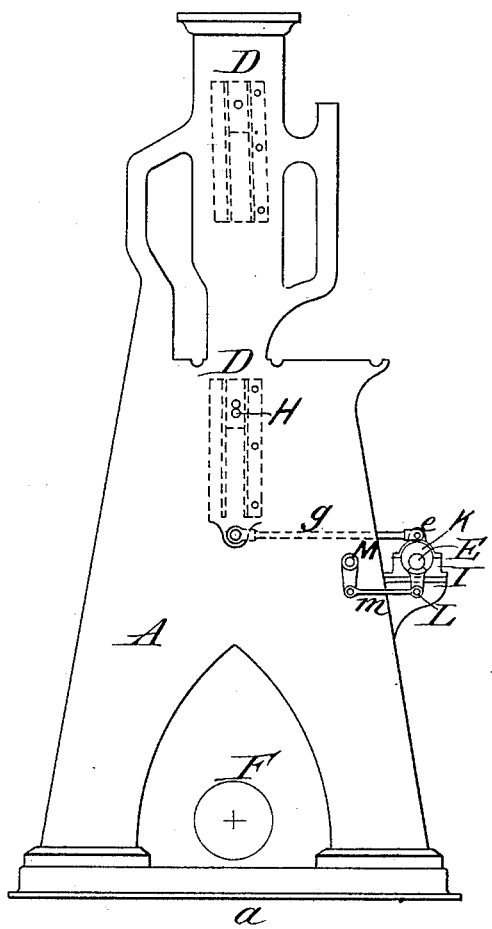
Figure 3:
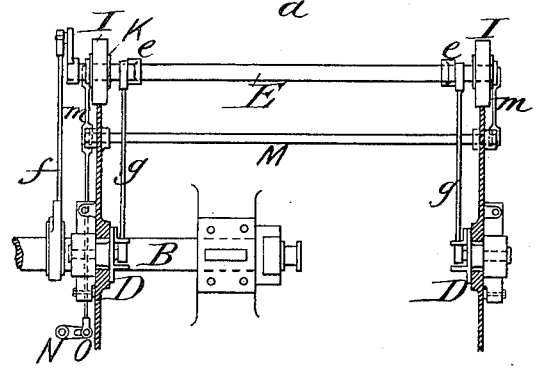
Figure 4:
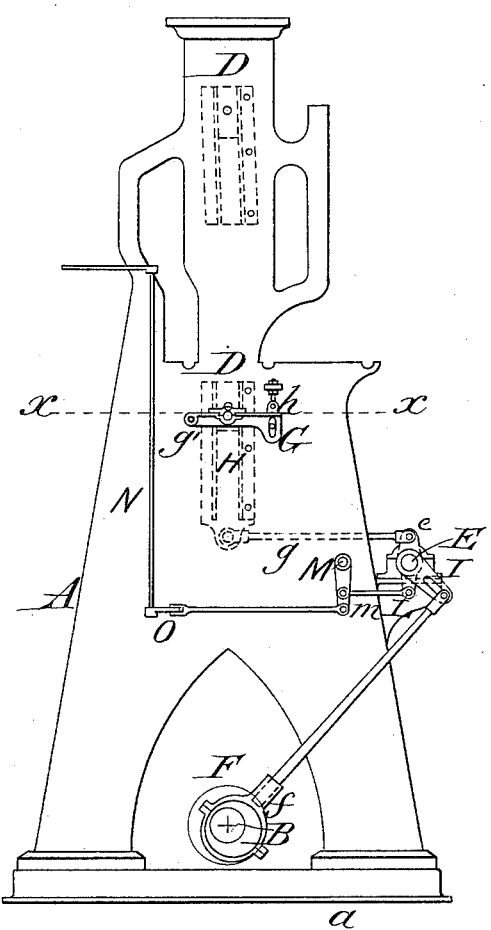
Figure 7:
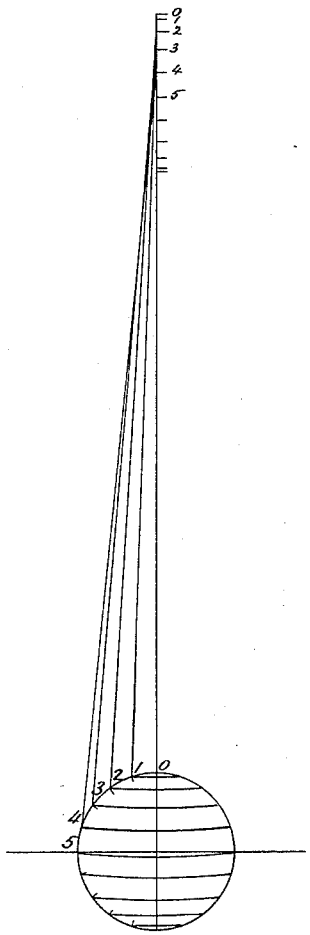
Figure 5:
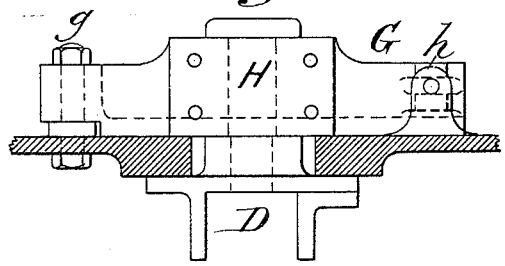
Figure 6:
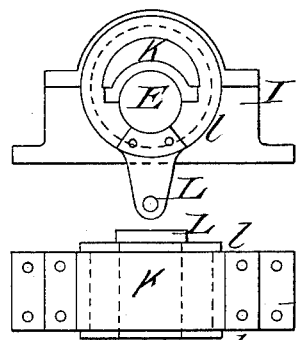

In the annexed drawings, illustrating my invention, Figure 1 is a front elevation of my improved gang-saw mill, showing gate and the saws carried therein at the upper limit of the stroke. Fig. 2 is a side elevation. Fig. 3 is a sectional plan view on the line $x\,x$ of Fig. 4, looking from the bottom of the machine. Fig. 4 is a side elevation showing the ordinary method of oscillating the rock-shaft, together with the mechanism for operating the eccentric boxes and the lower slides, and the movable box on which the lower slide oscillates. Fig. 5 is an enlarged plan view of one of the adjustable boxes for carrying the lower slides. Fig. 6 represents details of the construction of the eccentric boxes which carry the rock-shaft; and Fig. 7 is a diagram of the travel of the upper pin of the pitman when moving over equal distances on the periphery of the crank-travel.

Like letters of reference designate like parts in the several views.

A A represent the sides of a gang-frame; *a*, the bed; B, the crank-shaft, provided with crank and pin; *b*, the pitman for operating the gate; C C, the upper and lower girder or beams of the gate; *c c*, the stiles or rails for fastening the girders together, and *d* the saws for cutting the lumber. To the vertical sides A A of the frame are secured in any suitable manner the slides D D, which contain the blocks or boxes on which the gate is carried. Across the frame extends the rock-shaft E, which connects with the lower slides by means of the arms $e\ e$ and the connecting-rods $g\ g$, and operates to move these lower slides backward and forward.

F represents the throw of the crank-pin, and $f$ is the rod for connecting the crank-shaft B with the rock-shaft E, so as to actuate the latter to produce the rake for each cut.

G G represent movable boxes, which carry pins H, firmly secured to the lower slides, D. These boxes are preferably hinged at one end by means of pins $g'$, fastened to the frame. The other end of each of these boxes is formed with a slotted lug, through which passes a pin, $h$, this pin carrying a bolt, which is used for raising or lowering the box. This bolt passes through a lug cast on the frame, and is securely held in position by means of nuts on top and bottom of the same. (See Figs. 4 and 5.) The slot in the end of the box allows the necessary range of movement in a vertical direction, so that the box may be placed in any desired position, when it can be firmly held by means of the bolts and screws. The pins H are fastened to the lower slides in some convenient manner, and they constitute the centers of oscillation of the lower slides. They are so situated that when the gate is at its upper limit the centers of these pins will be below the center of the pins which are fastened to the lower girder, on which the slide-blocks oscillate, and below sufficiently to equalize the cut of the saw when first entering a log. By raising or lowering these boxes G G, a change is effected in the amount of the rake which takes place at the commencement of the cut in the downward stroke.

The frame of the machine is constructed with projecting arms, which carry boxes I I, rigidly secured thereon. (See Figs. 4 and 6.) Within these boxes oscillate the eccentric boxes K K, which are provided with caps, and have projecting lips $l\ l$, for the purpose of keeping the boxes in position. These eccentric boxes carry the rock-shaft E, which serves to operate the lower slides. The eccentric boxes are provided with arms L. (See Figs. 2 and 6.)

M is a shaft extending across the frame and journaled in suitable bearings, in which it oscillates. This shaft is provided at each end with a lever. One of these levers, as shown in Fig. 2, is of the necessary length to enable the levers for operating the rock-shaft E to be properly connected with it, while the lever at the opposite end (see Fig. 4) is also adapted to be similarly connected with the rock-shaft; but it is longer than the other, and extends downward, in order to be connected with means for operating the feed. The levers on the shaft M and the levers L on the eccentric boxes are connected by the links $m$.

N represents the rod which is operated to change the feed. To this is attached a slotted lever, O, which is connected by a rod with the lever on the end of shaft M, the object of the slotted lever being to regulate the throw of the levers in operating the eccentric boxes.

The operation of my device is as follows: Suppose the gate to be at the upper end of its stroke. The saws will then be in a position to commence cutting. As they begin to descend, the motion at this point being slow the bottom of the saws are made to recede from the log in proportion to the travel of the saws. From the beginning of the stroke until the center of the pin in the lower gird descends opposite the center of oscillation of the slides, there will be no rake, but from that point the rake increases in proportion to the speed or travel of the saw. This operation of the device equalizes the cut through the entire length of the saw.

In changing the feed from one speed to another the rake should, in order to do good work, be changed in the same proportion. This is accomplished by changing laterally the position of the rock-shaft E by means of the eccentric boxes, and said rock-shaft being connected with the lower slides also changes their position.

It is not my intention to confine myself in this application to the specific mechanism shown and described for changing the position of the rock-shaft. Various other mechanical appliances besides the eccentric boxes might be made use of; and I claim, broadly, the feature of laterally changing the shaft so as to adjust the rake.

The movement of a straight gang of the ordinary kind is represented in the diagram Fig. 7. The travel of the saw near the upper and lower ends of the stroke being slow and the feed being constant, causes the saws at these two points to receive an undue strain. This is caused by the feed being constant, while the saw itself travels much slower at the beginning than at the quarter, as will be seen from the diagram. Ordinary oscillating gangs have tried to overcome this trouble by giving to the gate a rocking movement, the effect of which is to increase the strain on the saws at the beginning of the stroke while the cutting-surface of the teeth is diminished. The object attained by this arrangement and construction of parts is the entire absence of undue strain on any part of the saw, the use of thinner saws, by virtue of which the speed of the gang can be increased accordingly, admitting at the same time the advantage of carrying as heavy feed as gangs of any other construction. In the usual operation of other gangs the cut at the beginning of the stroke is too heavy, thereby leaving ragged edges on the under side of the cant.

By the use of thin saws with my arrangement of oscillation, the saws cutting light at the beginning of the stroke, lumber is cut not only smooth but the saw-kerf being smaller results in a saving of lumber not otherwise attained with gang-saws.

Having thus described my invention, what

I claim as new, and desire to secure by Letters Patent, is—

1. In a gang-saw mill, the combination of the lower slides, D D, arranged to oscillate on pins whose centers are below the centers of the pins on the lower girder of the gate when the latter is at the upper limit of its stroke, the rock-shaft E, connecting with slides by rods g, and having levers L, and the lever M, connecting with the said levers L, and also with the rod N, substantially as and for the purposes specified and shown.

2. The combination of the movable lower slides, D D, the rock-shaft E, eccentric boxes K K, which oscillate in the bearings I I, the rods g, connecting the slides with the rock-shaft, the levers L, fastened to the eccentric boxes, and the shaft M, having short levers on each end which connect by links with levers L, and by levers with rod N, all arranged and operating substantially as shown and described.

3. The combination of the gate carrying the saws, the rock-shaft E, levers g, the levers L on each extremity of the rock-shaft, shaft M, connecting with rock-shaft by links m, and to rod N by levers, the crank-shaft B, and pitman b, all arranged substantially as shown, and for the purposes set forth.

4. The combination, with the lower slides and the rock-shaft carried by the eccentric boxes, of the shaft M, provided on each end with short levers which connect by links m with the levers L on the eccentric boxes, and by levers with the rod N, all arranged and operating to adjust the rake of the saws in proportion to the feed, as shown and set forth.

In testimony whereof I affix my signature in presence of two witnesses.

HENRY McEVILLA.

Witnesses:
ROBERT WEIR,
D. J. MORIARTY.